United States Patent
Prociw et al.

(10) Patent No.: US 7,565,807 B2
(45) Date of Patent: Jul. 28, 2009

(54) HEAT SHIELD FOR A FUEL MANIFOLD AND METHOD

(75) Inventors: Lev Alexander Prociw, Elmira (CA); Oleg Morenko, Mississauga (CA); Harris Shafique, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 756 days.

(21) Appl. No.: 11/035,733

(22) Filed: Jan. 18, 2005

(65) Prior Publication Data
US 2006/0156731 A1    Jul. 20, 2006

(51) Int. Cl.
*F02C 3/00* (2006.01)
(52) U.S. Cl. .......................... 60/799; 60/796
(58) Field of Classification Search .................. 60/800, 60/799, 734, 752, 796, 798
See application file for complete search history.

(56) References Cited

U.S. PATENT DOCUMENTS

| | | | |
|---|---|---|---|
| 2,151,540 A | 3/1939 | Varga | |
| 2,946,185 A | 7/1960 | Bayer | |
| 3,213,523 A | 10/1965 | Boehler | |
| 3,472,025 A | 10/1969 | Simmons et al. | |
| 4,100,733 A | 7/1978 | Streibel et al. | |
| 4,322,945 A | 4/1982 | Peterson et al. | |
| 4,327,547 A | 5/1982 | Hughes et al. | |
| 4,404,806 A | 9/1983 | Bell, III et al. | |
| 4,483,137 A | 11/1984 | Faulkner | |
| 5,036,657 A | 8/1991 | Seto et al. | |
| 5,253,471 A | 10/1993 | Richardson | |
| 5,271,219 A | 12/1993 | Richardson | |
| 5,285,632 A * | 2/1994 | Halila | 60/796 |
| 5,396,759 A | 3/1995 | Richardson | |
| 5,400,968 A | 3/1995 | Sood | |
| 5,419,115 A | 5/1995 | Butler et al. | |
| 5,423,178 A | 6/1995 | Mains | |
| 5,570,580 A | 11/1996 | Mains | |
| 5,579,645 A | 12/1996 | Prociw et al. | |
| 5,598,696 A | 2/1997 | Stotts | |
| 5,737,921 A | 4/1998 | Jones et al. | |
| 5,771,696 A * | 6/1998 | Hansel et al. | 60/739 |
| 5,848,525 A | 12/1998 | Spencer | |

(Continued)

FOREIGN PATENT DOCUMENTS

| | | |
|---|---|---|
| CA | 1013153 | 7/1977 |
| CA | 2307186 | 5/1999 |
| EP | 0660038 | 6/1995 |
| EP | 0939275 | 9/1999 |
| GB | 2404976 | 2/2005 |
| WO | WO 9504244 | 9/1995 |

OTHER PUBLICATIONS

U.S. Appl. No. 11/220,849, Prociw et al.

(Continued)

*Primary Examiner*—Michael Cuff
*Assistant Examiner*—Phutthiwat Wongwian
(74) *Attorney, Agent, or Firm*—Ogilvy Renault LLP

(57) ABSTRACT

The manifold includes supports which slidably engage a heat shield to floatingly suspend it around the manifold. The manifold is part of a heat shield assembly inside a gas turbine engine. The assembly comprises a plurality of radially-extending supports extending from a casing of the engine to the manifold. A heat shield encloses the manifold. The heat shield has openings through which the supports pass to slidably engage the heat shield. The supports floatingly suspend the heat shield relative to the manifold.

19 Claims, 2 Drawing Sheets

U.S. PATENT DOCUMENTS

| | | | |
|---|---|---|---|
| 5,956,955 | A | 9/1999 | Schmid |
| 5,983,642 | A | 11/1999 | Parker et al. |
| 5,996,335 | A | 12/1999 | Ebel |
| 6,109,038 | A | 8/2000 | Sharifi et al. |
| 6,141,968 | A | 11/2000 | Gates et al. |
| 6,149,075 | A | 11/2000 | Moertle et al. |
| 6,240,732 | B1 | 6/2001 | Allan |
| 6,256,995 | B1 | 7/2001 | Sampath et al. |
| 6,463,739 | B1 | 10/2002 | Mueller et al. |
| 6,761,035 | B1 | 7/2004 | Mueller |
| 7,028,484 | B2 | 4/2006 | Prociw et al. |
| 2003/0014979 | A1 | 1/2003 | Summerfield et al. |
| 2005/0188699 | A1 | 9/2005 | Shafique et al. |
| 2006/0156733 | A1 | 7/2006 | Prociw et al. |
| 2006/0218925 | A1 | 10/2006 | Prociw et al. |

OTHER PUBLICATIONS

U.S. Appl. No. 11/465,655, Morenko.
U.S. Appl. No. 11/489,533, Morenko.
U.S. Appl. No. 11/366,815, Olver.
U.S. Appl. No. 11/366,816, Fish.
U.S. Appl. No. 11/366,814, Patel et al.
U.S. Appl. No. 11/513,030, Morenko et al.
U.S. Appl. No. 11/532,611, Rudrapatna et al.
U.S. Appl. No. 11/535,185, Morenko et al.
U.S. Appl. No. 11/534,381, Fish et al.
U.S. Appl. No. 11/552,240, Patel et al.

* cited by examiner

HEAT SHIELD FOR A FUEL MANIFOLD AND METHOD

TECHNICAL FIELD

The field of the invention relates generally to heat shields for use in gas turbine engines.

BACKGROUND OF THE ART

In gas turbine engines, internal manifolds used for distributing fuel to fuel nozzles must be insulated since the intense heat may cause fuel passage coking. However, conventional heat shields are attached to manifolds by welding which introduces zones of high mechanical stresses and conduction points, through which heat may be relatively easily transmitted from the heat shield to the manifold by conduction. The high mechanical stresses are the result of the welding process itself, as well as sharp thermal gradients between the hot heat shield and the relatively cooler manifold. Also, the thermal expansion and contraction of the heat shield create further stresses at the welded fixing locations.

Accordingly, there is a need to provide an improved heat-shielded manifold.

SUMMARY OF THE INVENTION

In one aspect, the present invention provides a heat shield assembly for a fuel manifold inside a gas turbine engine, the assembly comprising a plurality of radially-extending supports extending form the engine to the manifold, a heat shield for enclosing the manifold, the heat shield having openings through which the supports pass to slidably engage the heat shield and thereby floatingly suspend the heat shield relative to the manifold.

In a second aspect, the present invention provides heat-shielded manifold comprising: an annular manifold body; at least three supports radially extending from the manifold body and being symmetrically disposed therearound; a heat shield body spaced-apart from and enclosing the manifold body, the heat shield body having an opening therethrough corresponding to each support; and a set of bosses mounted to the heat shield in said openings, each boss slidably engaging the supports relative to the heat shield and thereby the heat shield relative to the manifold.

In a third aspect, the present invention provides fuel manifold for a gas turbine engine, the manifold comprising: an annular manifold body configured for assembly inside a gas turbine engine; an annular heat shield surrounding the manifold body and spaced radially outward therefrom; manifold support means for supporting the manifold body relative to the engine; and heat shield support means for slidingly supporting the heat shield relative to the manifold.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
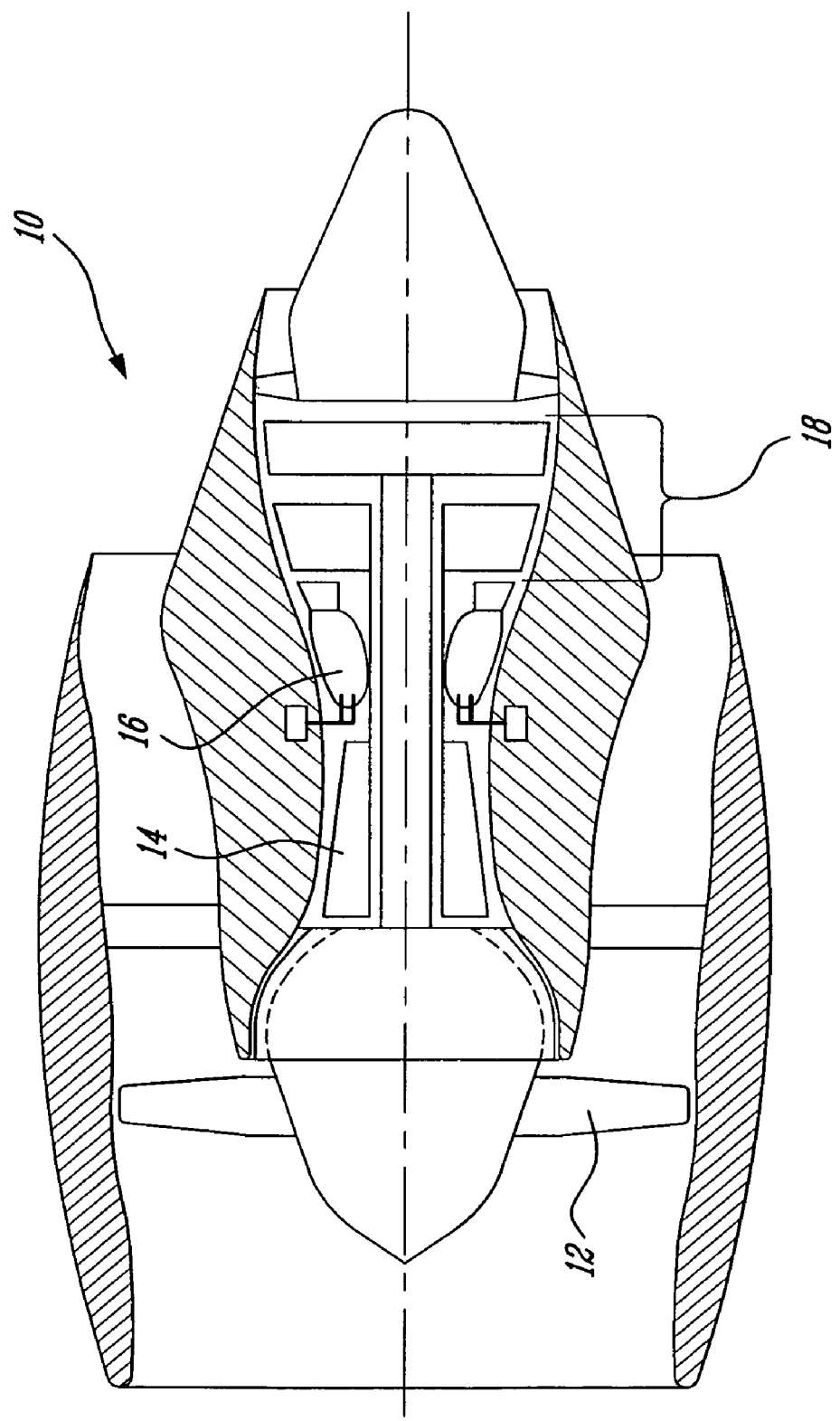
FIG. 1 is a schematic cross-sectional view of a generic gas turbine engine to illustrate an example of a general environment in which the invention can be used.

FIG. 1 schematically illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Fuel is provided to combustor 16 through fuels nozzles (not shown) fed by an internal fuel manifold. This figure illustrates an example of the environment in which the present invention can be used.

Figure 2:
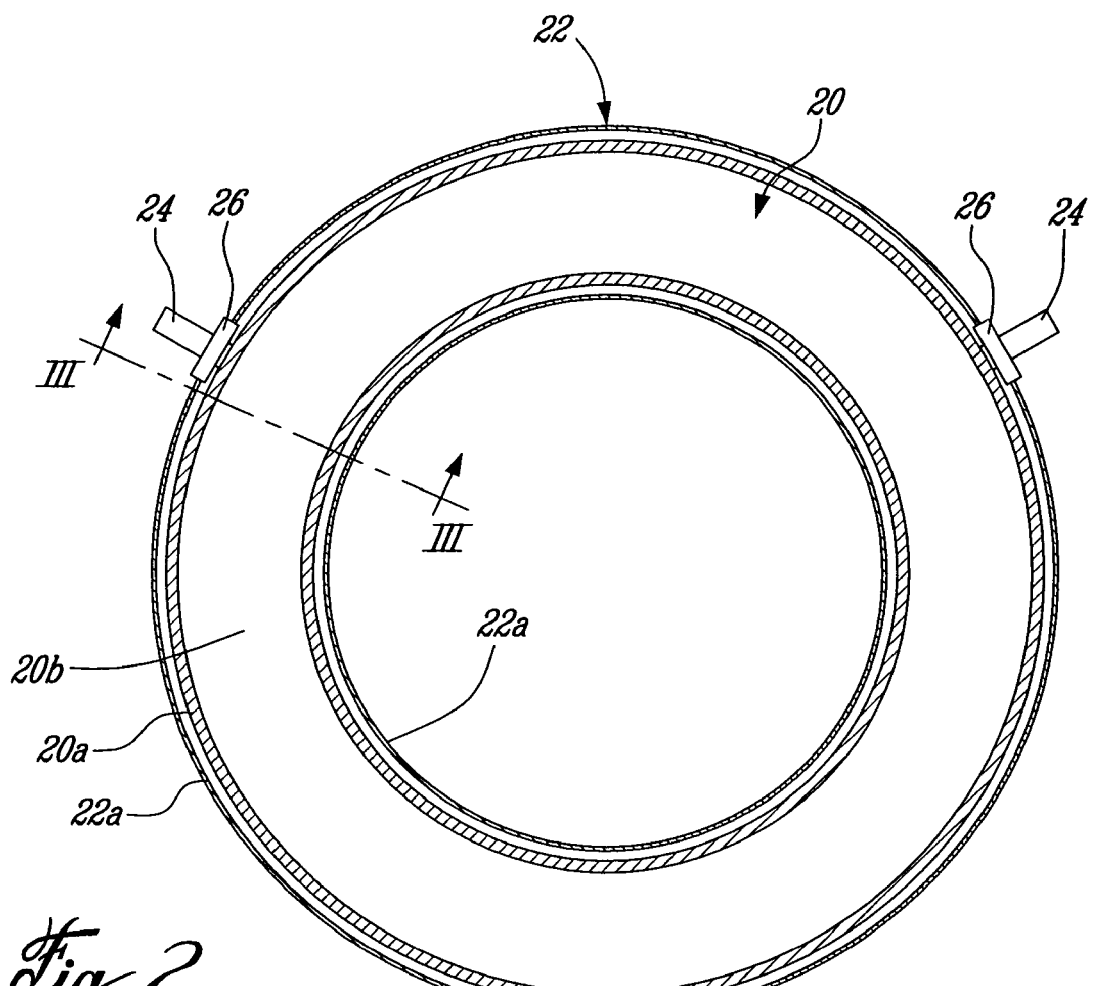
FIG. 2 is a schematic side view of a fuel manifold provided with a heat shield in accordance with a possible embodiment of the present invention.

FIG. 2 is a schematic side view of an example of an annular fuel nozzle manifold 20 provided within a heat shield 22 in accordance with the present invention. This manifold 20 is located adjacent the combustor 16 of the engine 10. The manifold 20 comprises a body 20a which is preferably surrounded on all sides by the heat shield 22, as shown in FIG. 3, to help shield it from heat inside the engine 10.

The manifold 20 comprises a plurality, and preferably at least three, radially-extending supports 24. These supports 24 are preferably symmetrically disposed on a radially outer wall of the manifold 20. The supports 24 are welded or otherwise attached to the manifold 20. The supports 24 preferably in the form of pins having a circular cross-section, although other shapes are possible as well. The manifold 20 comprises a plurality of fuel nozzles (not shown) connected to one of the radially extending walls. The fuel nozzles project out of the heat shield 22 through corresponding holes (not shown). Fuel is supplied into the manifold 20 through at least one of the supports 24 and is distributed inside the manifold 20 through its internal cavity 20b.

Figure 3:
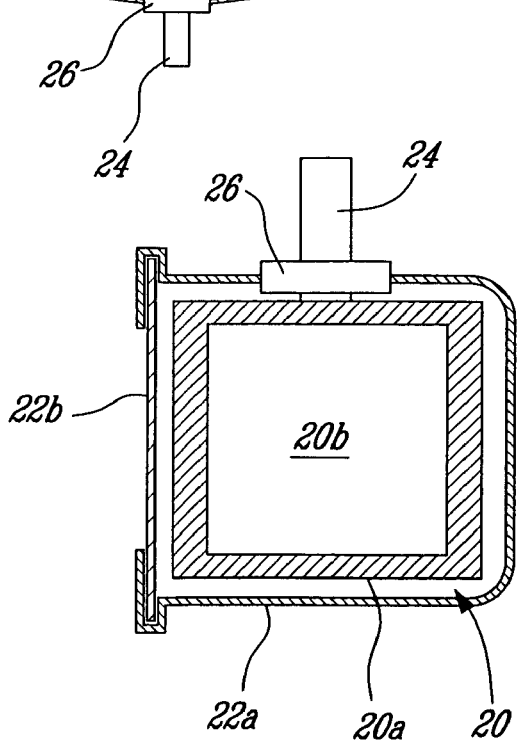
FIG. 3 is a schematic cross-sectional view taken along line III-III in FIG. 2.

FIG. 3 shows that the heat shield 22 is preferably made of a main U-shaped part 22a which is closed, on one of its side, by an side wall 22b crimped to the U-shaped part 22a. Other configurations are also possible, as will be understood by the skilled reader.

The heat shield 22 includes a plurality of holes (not indicated) corresponding to the supports 24, and preferably also comprises bosses 26, one for each hole and support 24. Each hole and boss 26 is slidably engaged over a corresponding support 24. These supports 24 project out of these holes, which are provided in a radially outer wall of the heat shield 22. Each boss 26 is preferably rigidly connected to the periphery of one corresponding hole. The bosses 26 act as guides to guide the heat shield as it thermally expands relative to the supports. Such expansion for an annular body is usually radial in direction (if the heat shield is otherwise unconstrained) and thus the supports 24 are preferably radially oriented. The supports are thus preferably adapted to facilitate at least one degree of freedom for thermal expansion. In this embodiment, the adaptation includes radial orientation and sliding fit, but in other embodiments the adaptation may be any suitable for that embodiment.

As can be appreciated, using supports 24 and the corresponding holes in heat shield 22, and with preferably corresponding bosses 26 preferably installed within the holes, allows the heat shield 22 being floatingly suspended relative to the manifold 20 and therefore be maintained in position but out of contact with the manifold body 20a. When heated, the heat shield 22 may expand (in this case, radially) without imposing any stress on the manifold 20, and yet guided to maintain its general relative position vis-a-vis the manifold 20.

Each support 24 is preferably made of a material having a low thermal conductivity. This will reduce the amount of heat transmitted to the manifold body 20a, either from the tip of the supports 24 or from the heat shield 22, or the engine case.

The present invention also provides a method of heat shielding an annular fuel nozzle manifold 20. This method comprises providing at least three radially-extending supports 24 on a radially outer wall of the manifold 20. The manifold 20 is then enclosed in a heat shield 22 and the two of them are maintained in a spaced-apart relationship. The radially-extending supports 24 of the manifold 20 then project out of the heat shield 22 through the corresponding holes located on a radially outer wall of the heat shield 22. Each hole is provided with a boss 26 located on its periphery and engaged over one corresponding support 24.

The above description is meant to be exemplary only, and one skilled in the art will recognize that changes may be made to the embodiments described without departing from the scope of the invention disclosed. For example, the shape, configuration and construction of the manifold 20 and/or heat shield 22 can be any suitable for a given application. Any suitable number of supports 24 can be provided. The supports need not be "pins" per se, but rather may be any suitable support arrangement having the functions herein disclosed. The invention may be applied to any suitable engine. Bosses need not support the heat shield relative to the supports, and any suitable alternative may be used, such as floating collars, sliding guides, etc. Fuel may also be provided through another inlet that is not one of the supports 24. Still other modifications which fall within the scope of the present invention will be apparent to those skilled in the art, in light of a review of this disclosure, and such modifications are intended to fall within the appended claims.

The invention claimed is:

1. A heat shield assembly for a fuel manifold inside a gas turbine engine, the assembly comprising a plurality of radially-extending supports extending from a casing of the engine to the fuel manifold, a heat shield for enclosing the fuel manifold, the heat shield having openings through which the supports pass, a guide member extending between each support and the heat shield, the guide member slidably engaging the heat shield with the supports, at a radial position on the supports between the casing and the fuel manifold, to floatingly suspend the heat shield in an out-of-contact relation with the fuel manifold and with the casing.

2. The heat shield assembly as defined in claim 1, wherein at least one of the supports is used as a fuel inlet to supply fuel inside the fuel manifold.

3. The heat shield assembly as defined in claim 1, wherein the supports are cylindrical pins.

4. The heat shield assembly as defined in claim 1, wherein the guide members comprise bosses provided between the supports and the heat shield to provide sliding contact therebetween.

5. A heat-shielded manifold comprising:
a annular manifold body disposed inside a gas turbine engine case;
a plurality of supports radially extending from the manifold body to the case and being symmetrically disposed therearound;
a heat shield body spaced-apart from and enclosing the manifold body, the heat shield body having an opening therethrough corresponding to each support; and
a set of bosses mounted to the heat shield body in said openings, each boss slidably engaging the supports relative to the heat shield body, the bosses and supports thereby supporting the heat shield body relative to the manifold body.

6. The heat-shielded manifold as defined in claim 5, wherein at least one of the supports is used as a fuel inlet to supply fuel inside the manifold body.

7. The heat-shielded manifold as defined in claim 5, wherein the supports are cylindrical pins.

8. The heat-shielded manifold as defined in claim 5, wherein the bosses are provided between the supports and the heat shield body.

9. The heat shield assembly as defined in claim 1, wherein the heat shield comprises a first annular sheet metal member having a substantially U-shaped cross-section which is closed on its open side by a second substantially flat annular member, and wherein the fuel manifold is disposed inside the U-shaped member.

10. The heat shield assembly as defined in claim 1, wherein walls of the heat shield are spaced apart a substantially constant distance from the outer and inner peripheries surfaces of the fuel manifold.

11. The heat-shielded manifold as defined in claim 5, wherein the heat shield body comprises a first annular sheet metal member having a substantially U-shaped cross-section which is closed on its open side by a second substantially flat annular member, and wherein the fuel manifold body is disposed inside the U-shaped member.

12. The heat-shielded manifold as defined in claim 5, wherein walls of the heat shield body are spaced apart a substantially constant distance from the outer and inner peripheries surfaces of the manifold body.

13. A gas turbine engine comprising:
a casing enclosing a combustor;
an annular fuel manifold mounted inside the case adjacent the combustor, the annular fuel manifold mounted to the case via a plurality of radially extending supports; and
a heat shield slidably mounted to the supports by a plurality of guide members extending between the heat shield and a plurality of the supports, the guide members being at an intermediate radial position along the supports to be in an out-of-contact relation with the case and the annular fuel manifold, the heat shield enveloping the annular fuel manifold in a spaced-apart manner.

14. The gas turbine engine as defined in claim 13, wherein each guide member is located around a hole corresponding to one of the supports provided in an outer wall of the heat shield.

15. The gas turbine engine as defined in claim 14, wherein a boss is provided between the heat shield and each support.

16. The gas turbine engine as defined in claim 15, wherein each boss slidingly engages its respective support.

17. The gas turbine engine as defined in claim 15, wherein the boss is configured to, in use, guide radial thermal expansion of the heat shield.

18. The gas turbine engine as defined in claim 13, wherein the heat shield comprises a first annular sheet metal member having a substantially U-shaped cross-section which is closed on its open side by a second substantially flat annular member, and wherein the annular fuel manifold is disposed inside the U-shaped member.

19. The gas turbine engine assembly as defined in claim 13, wherein walls of the heat shield are spaced apart a substantially constant distance from the outer and inner peripheries surfaces of the annular fuel manifold.

* * * * *